Figure 1:
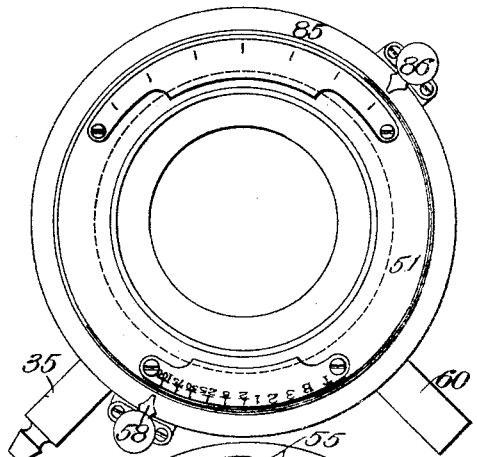

No. 798,595. PATENTED SEPT. 5, 1905.
T. BRUECK.
PHOTOGRAPHIC SHUTTER.
APPLICATION FILED DEC. 17, 1903.
MODEL. 2 SHEETS—SHEET 1.

Witnesses
Walter B. Payne
Russell B. Griffith

Inventor
Theodor Brueck
by
his Attorney

No. 798,595. PATENTED SEPT. 5, 1905.
T. BRUECK.
PHOTOGRAPHIC SHUTTER.
APPLICATION FILED DEC. 17, 1903.
MODEL. 2 SHEETS—SHEET 2.
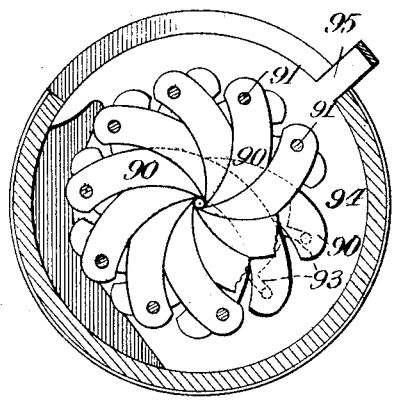
Fig. 8.
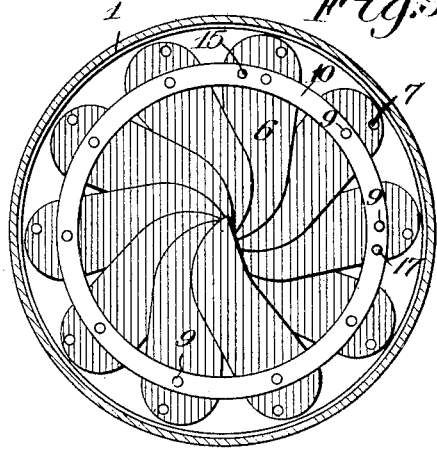
Fig. 9.
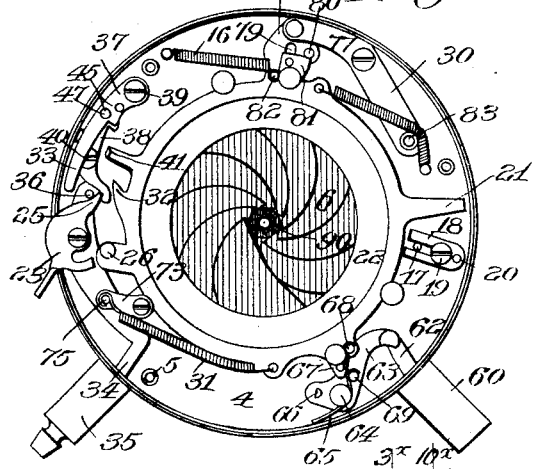
Fig. 6.
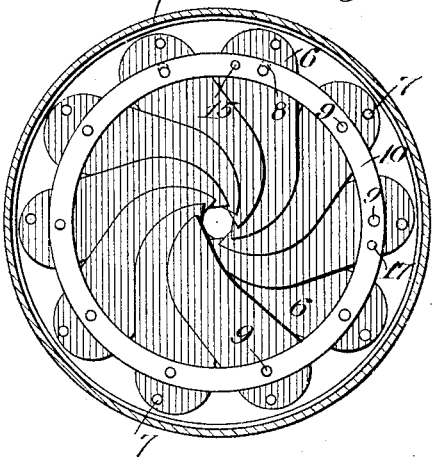
Fig. 10.
Fig. 7.
Witnesses
Walter B. Payne
Russell B. Griffith
Inventor
Theodor Brueck
By Frederick G. Church
his Attorney

UNITED STATES PATENT OFFICE.

THEODOR BRUECK, OF ROCHESTER, NEW YORK, ASSIGNOR TO THE BAUSCH & LOMB OPTICAL COMPANY, OF ROCHESTER, NEW YORK, A CORPORATION OF NEW YORK.

PHOTOGRAPHIC SHUTTER.

No. 798,595.          Specification of Letters Patent.          Patented Sept. 5, 1905.

Application filed December 17, 1903. Serial No. 185,544. (Model.)

*To all whom it may concern:*

Be it known that I, THEODOR BRUECK, of Rochester, in the county of Monroe and State of New York, have invented new and useful Improvements in Photographic Shutters; and I do hereby declare the following to be a full, clear, and exact description of the same, reference being had to the accompanying drawings, forming a part of this specification, and to the reference-numerals marked thereon.

My present invention relates to shutters for photographic cameras, and particularly to that class known as "diaphragm-shutters;" and it has for its object to provide a new and improved arrangement of the mechanism for controlling the operation of the blades, which may be set so that the blades when operated will be opened only the required distance to give the desired stop or lens aperture when the shutter is operated for either instantaneous, time, or bulb exposures, My invention also has for its object to provide an adjustable diaphragm capable of conjoint operation with the blade-controlling mechanism, whereby the latter diaphragm will also be set to give the desired stop or lens-aperture to compensate for any lost motion or inaccuracy in the movement of the shutter-blades, such as springing of the parts, due to inertia or other causes, when the shutter is operated for making instantaneous or other such exposures.

To these and other ends my invention consists of certain improvements in construction and combinations of parts, all as will be more fully described, the novel features being pointed out in the claims at the end of the specification.

In the drawings similar reference-numerals indicate similar parts in the several figures.

Figure 2:
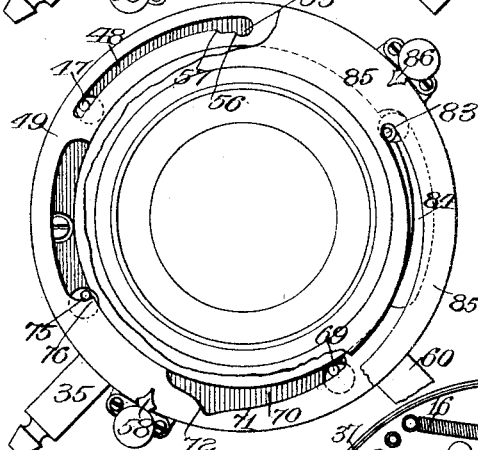
Figure 3:
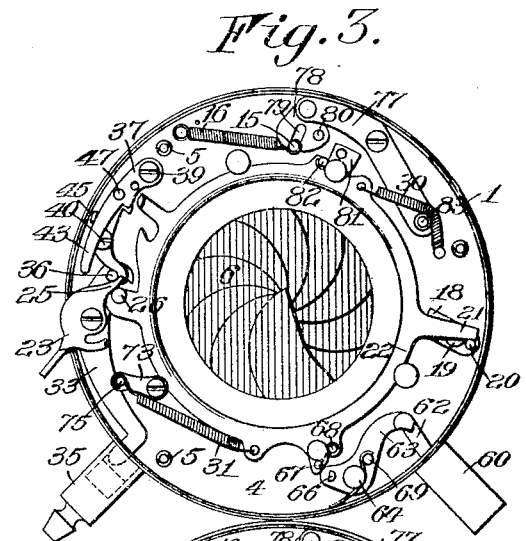
Figure 4:
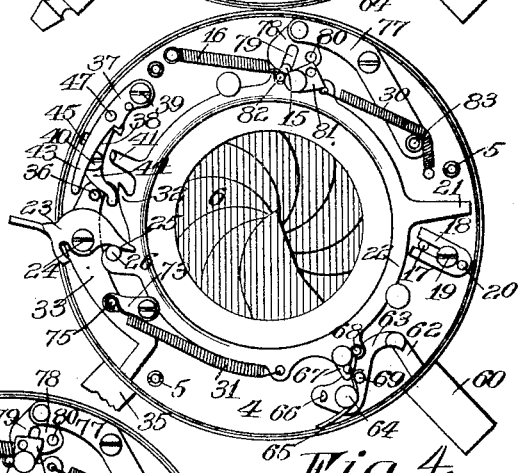
Figure 5:
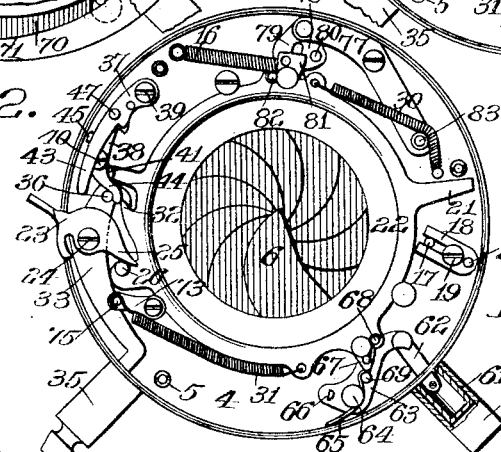

Figure 1 is a front elevation of a shutter constructed in accordance with my invention. Fig. 2 is a similar view showing parts of the cover broken away to illustrate the construction of the controlling-plate. Fig. 3 is a front elevation of the controlling and operating mechanism, showing the parts in the normal position and taken on the line $3^x 3^x$ of Fig. 7. Fig. 4 is a similar view showing the parts when being moved into operative position by the setting-lever, and Fig. 5 shows the parts in operated position and in readiness to make an exposure. Fig. 6 illustrates the shutter with the blades open and the operating and controlling mechanism in their relative positions when moving to close the blades. Fig. 7 is a cross-sectional view of the shutter. Fig. 8 is a sectional view on the line $8^x 8^x$ of Fig. 7; and Figs. 9 and 10 are similar views on the line $10^x 10^x$, illustrating the shutter-blades in the closed and open position, respectively.

A shutter constructed in accordance with my invention is preferably mounted in a hollow cylindrical casing 1, provided at its rear side with a hub 2, which is threaded upon its interior surface for the application of the usual lens-casing and upon its exterior for application to the lens-board or front of the camera, if the shutter is employed with a single lens. The front of the casing is closed by a cover 3, having a central aperture which is threaded and adapted to receive the usual sleeve of the front lens-tube. The shutter mechanism is arranged within the casing and is preferably supported independently thereof upon a plate or septum 4, secured within the casing by means of threaded studs or bolts 5. The septum rests against an annular rim or shoulder, and in the space thus provided between it and the bottom of the casing are arranged the shutter blades or leaves 6, pivoted to the plate 4 at the points 7 and having their outer ends overlapping, as shown in Figs. 9 and 10. The outer ends of the blade are provided with one substantially straight edge and one curved edge and are of such a shape that when they are turned upon their pivots in one direction the light-passage through the shutter will be closed, and when operated in the opposite direction they will be opened to form a substantially circular aperture, located concentric of the aperture in the casing, as shown in Figs. 6 and 10. These blades are provided with slots 8, as shown in dotted lines in Fig. 10, adapted to receive operating-pins 9 on an oscillatory frame or operating member in the form of a ring 10, located in an annular recess in the rear side of the septum 4. This ring is provided with a stud or pin 15, extending through a suitable aperture in the plate 4 and having attached at its outer end an operating-spring 16, which normally operates to rotate the ring 10 and hold the leaves or blades in the closed position. A similar pin or projection 17 also projects through an aperture in the septum, and engaging therewith is the bifurcated or slotted end of a returning-lever 18, pivoted at 19 and provided at its outer end with a stud 20, adapted to be engaged by a finger or projection 21 on the annular oscillatory master member 22, whereby when the latter is released the lever 18 will be operated to rotate the ring 10 to positively close the blades.

The setting-lever 23 is pivoted upon a screw or stud 24 on the plate 4, and it is provided with a nose 25, adapted to engage a pin 26 on the master member to move the latter from the position shown in Fig. 3 to that illustrated in Fig. 5 against the tension-springs 30 and 31. The master member is provided with a hook 32, with which coöperates the latch member 33, also pivoted on the stud 24, having the end 34 adapted to be operated by the movable piston or plunger of a pneumatic engine 35. The latch member is provided with a pin 36, adapted to be engaged by the rear side of the nose 25 on the setting-lever to permit the master member to be released manually and independently of the operation of the pneumatic engine, if desired. In order to adapt the shutter for making bulb and time exposures, separate levers 37 and 38 are provided, which are pivoted, respectively, at the points 39 and 40 and having projections or shoulders adapted to coöperate with a detaining stop or projection 41 on the master-levers. These members are connected by a spring 42, normally tending to revolve them on their pivots, so that their shoulders will lie in the path of the detaining-stop; but the lever 37 is provided with an end 43, which engages the outer side of the pin 36 on the lever 33, so that its shoulder will be held out of the path of the stop 41 when the lever 33 is operated to release the master member. The lever 38 is provided with the finger 44, which is engaged by the inner side of the pin 36 to move said lever into an inoperative position when the lever 33 is in normal position, and also arranged thereon is a projection or lip 45, adapted to be engaged by the lever 37 when both of said levers are moved into an inoperative position. On the lever 37 is a pin 47, which projects through an aperture in the front plate of the casing into a concentric slot 48, formed in the controlling-plate 49, journaled on the front 3 of the casing and held in position in rear of the diaphragm-setting plate 50 and the front graduated ring 51. The slot 49 has the enlarged end 55, and it is provided with the successive cam-surfaces 56 and 57, the first of which, engaging the pin 47, moves the lever 37 out of the path of the detaining-stop 41 and permits the conjoint operation of the levers 33 and 38 for the making of bulb-exposures. The cam-surface 57 operates when the ring is revolved to move the lever 37 into engagement with the lip 45 on the lever 38 and carries the latter outwardly, so that the shoulders on both the time and bulb levers are moved out of the path of the detaining-stop.

Operating in connection with the master member is a retarding device consisting of a cylinder 60, in which is arranged a piston 61, attached, by means of a link 62, with a bell-crank lever 63. This lever is pivoted at 64 and is operated to move the piston outwardly in its cylinder by means of a spring 65, and mounted on one arm of the lever is a stud 66, with which coöperates a projection on the master member in the form of a pivoted finger 67, provided with a rearwardly-rounded surface adapted to engage the stud to tilt the finger and allowed to pass by the latter when the master member is moved in one direction, the movement of the finger in the opposite direction being limited by means of a stop or projection 68, with which it is normally held in contact by a small spring. The lever 63 of the retarding device is provided with a pin 69, which projects through the front of the casing into a slot 70 in the controlling-plate 49, provided with a cam-surface 71 and 72, as shown, adapted to adjust the retarding device, so that the stud will be required to be moved through a greater or less distance when engaged by the finger 67 on the master member or to be moved out of the path of the latter when making very quick or instantaneous exposures. One of the operating-springs of the master member is shown attached to a pivoted arm 73, provided with a pin 75, adapted to be engaged by a shoulder 76 on the controlling-plate, so that the tension of the spring may be increased to accelerate the movement of the master member when the controlling-plate is revolved to move the retarding device and the bulb and time levers into inoperative positions.

The graduated ring 51 is provided with a scale containing the letters "T B," indicating time and bulb exposures, and with numerals indicating exposures of one, two, or three seconds duration and also larger numerals indicating exposures of portions of seconds.

Arranged on the setting-plate is a pointer 58, coöperating with the scale and so arranged relatively to the various cams on the controlling-plate that when it registers with the letter "T" of the scale the cam-surface 71 moves the retarding device to an inoperative position, and the pin 47 being disengaged from the cam-surfaces in the slot 48 both levers 37 and 38 are in a position to coöperate with the detaining stop or projection 41 on the master member for making time exposures. When the controlling-plate is adjusted to bring the indicator into registry with the letter "B," the retarding device is still held in an inoperative position; but the pin 47 is engaged by the cam-surface 56, and the lever 37 is held so that its shoulder is out of the path of the detaining-stop 41. The parts being in this position and the master member set as indicated in Fig. 5, the detaining-stop will be engaged by the shoulder on the lever 38 when the lever 33 is operated either by the setting-lever or the pneumatic engine to disengage the master member, and it will be seen that the member will be retained in this position until the lever 33 is released, when the pin 36, coöperating with the end 44 of the lever 38, will cause the shoulder thereon to be moved out of the path of the detaining-stop. For making exposures of various durations the controlling-plate is revolved successively into position with one or another of the various numerals of the scale, the cam-surface 57 moving both the levers 37 and 38 out of the path of the detaining-stop, and the cam-surface 72, coöperating with the pin 69, sets the retarding device to move different relative distances when engaged by the finger 67 on the master member until the shutter is set for making very rapid exposures, at which time the detaining device, as before explained, is moved to an inoperative position, and the shoulder 76 on the controlling-plate engages the pin 75 and moves the lever 73 to increase the tension of the spring 31.

In order to regulate the opening movement of the shutter blades or leaves 6 to produce an aperture or lens-stop of the desired size, there is pivoted to the plate or septum 4 a lever 77, carrying at its end a shutter-blade-operating lever 78, provided with a slot 79, in which the pin 15 on the ring 10 lies, and having a stud 80. Coöperating with the latter is a finger 81, pivoted to the master member and held against rotation in one direction when the master member is operating to move the blades by a stop 82, with which it is yieldingly held in engagement by a small spring, which permits the finger to tilt and pass beneath the stud when the master member is being set. The finger is arranged on the master member in such a position that it will engage the stud 80 and operate the lever 78, so that the blades 6 will be opened when the detaining-stop 41 engages the shoulders of either of the levers 37 and 38, and in order to hold the leaves in the open position when the movement of the master member is arrested the finger 81 is provided with a flat top, as shown. The rotation of the ring 10 will cause a movement of the returning-lever 18, and the engagement of the projection 21 on the master member with the stud 20 on said lever will cause the blades to be closed positively independently of the spring 16. The outer end of the lever 77 is provided with a pin 83, and the lever is normally held in the position shown in Fig. 3 by means of the master-member-operating spring 30, which for convenience is looped over the pin and operates to move the end of the lever inwardly. The pin 83 extends through an aperture in the cover 3 and the controlling-plate 49, and its outer end projects into a cam-slot 84, formed in the shutter-setting plate 85, journaled on the cover and held in position by the front ring 51. This plate is also provided with an indicator 86, coöperating with a suitable scale and indicating the lens-stop or size of the aperture formed when the leaves or blades of the shutter are open. By adjusting the lever 77 to move the pivotal point of the blade-operating lever 78 toward or from the pin 15 its length is decreased or increased, and as the stud 80 is accordingly adjusted toward or away from the master member it will be moved through a greater or less distance when engaged by the finger 81, so that the opening of the shutter-blades may be regulated to form apertures from the smallest size to the full size of the lens-aperture.

The rear side of the casing 1 is removable, and in a recess formed in the rear of the leaves or blades 6 is located an iris-diaphragm of the usual or any preferred form of construction. The one illustrated, however, embodies the segmental leaves 90, provided at one end with pivot-pins 91, which are journaled in suitable apertures formed in the rear wall 92 of the casing. At their opposite ends the leaves are provided with similar pins which rest in radially-extending slots 93 in an oscillatory plate or member 94, provided with an arm 95, which in the present instance extends exteriorly of the casing and engages the shutter-setting plate 85. It will be seen that by an adjustment of the setting-plate 85 so that the lever 77 is moved to change the position of the shutter-operating lever relatively to the pin 15 to regulate the opening movement of the blades the simultaneous movement of the ring 94 will cause an adjustment of the blades 90, making the aperture formed by them of the same size as that formed by the shutter-blades when opened. The blades 90, however, when in adjusted position remain relatively stationary and being arranged in proximity to the blades 6 will establish the size of the lens aperture or stop irrespective of the movement of the shutter-blades. This is an advantageous feature in connection with the diaphragm-shutter, as a positive lens-stop overcomes the difficulty occasioned by the springing of the shutter-blades, or caused by loose connections between the parts when the latter become worn, and especially when they are operated at high speeds for short exposures, whereby the blades in opening are liable to form an aperture slightly larger than the size of the stop for which the setting-plate is adjusted.

I claim as my invention—

1. In a camera-shutter, the combination with a plurality of blades, means for operating them, a master member and controlling devices therefor, of a regulating device coöperating with the operating means for varying the opening movement of the blades, a support for said device separate from the ring and a projection on the master member adapted to engage the regulating device.

2. In a camera-shutter, the combination with a casing a plurality of blades therein, means for actuating them into an open and closed position, a master member and controlling devices therefor, of an adjustable operating device supported on the casing and coöperating with the actuating means and a projection on the master member adapted to engage the operating device and means for operating the master member.

3. In a camera-shutter, the combination with a casing, a plurality of blades therein, a frame for actuating them into an open and closed position, a master member and controlling devices therefor, of an operating device supported on the casing and coöperating with the frame, means for adjusting it to vary the movement of the frame and a projection on the master member adapted to engage the operating device to open the blades, means for closing the latter and devices for operating the master member.

4. In a camera-shutter, the combination with a casing, a plurality of blades, a frame for actuating them into an open and closed position, a master member and controlling devices therefor, of an operating device supported on the casing and coöperating with the frame, means for adjusting it to vary the movement of the frame and a projection on the master member adapted to engage the operating device to open the blades, a member for closing them, a projection on the master member adapted to engage the closing member and devices for operating the master member.

5. In a shutter, the combination with a plurality of leaves or blades, a frame for opening and closing them and a master member, controlling devices therefor and means for operating the master member, of a lever coöperating with the frame and adjustable for varying the movement of the latter, a finger on the master member coöperating with the lever to open the blades, a separate lever attached to the frame and a projection on the master member coöperating with said lever to close the blades.

6. In a shutter, the combination with a plurality of blades, a frame for opening and closing them and a master member, controlling devices therefor and means for operating the member, of an adjustable lever coöperating with the frame, a finger on the master member coöperating with the lever when said member is operated in one direction to open the blades and means for closing the latter.

7. In a shutter, the combination with a plurality of blades, a frame for opening and closing them and a master member, controlling devices therefor and means for operating the member, of an operating-lever engaging the frame and means for adjusting the lever to change its pivotal point relatively to its point of connection with the frame, a finger on the master member coöperating with the lever to move the blades in one direction and means for moving them in the opposite direction.

8. In a shutter, the combination with a plurality of blades, a frame for opening and closing them and a master member, means for operating the latter and controlling devices for the master member embodying bulb and time exposure devices for arresting the movement of the said member, of an operating-lever attached to the frame and a finger on the master member coöperating with the lever to open the blades and hold them in such a position when the master member is arrested by either the bulb or time exposure devices, means for releasing the master member and a device for closing the blades.

9. In a shutter, the combination with a plurality of blades, a frame for opening and closing them and a master member, means for operating the latter and controlling devices for the master member embodying bulb and time exposure devices for arresting the movement of the said member, of a pivoted operating member connected to the frame, means for adjusting its pivotal point relatively to the frame and a finger on the master member for actuating the member to open the blades and having an engaging surface holding said member in the actuated position when the master member is engaged by the time or bulb exposure devices, means for releasing the member and a device for closing the blades operated by the master member.

10. In a camera-shutter, the combination with a plurality of pivoted overlapping blades, a frame for operating them, a master member and operating and controlling devices therefor, of a setting-lever, an operating-lever carried on the latter and adjustably connected to the frame, a latch on the master member adapted to coöperate with the setting-lever to open the blades and means for closing the latter.

11. In a shutter, the combination with a plate or septum, a plurality of pivoted blades and an oscillatory operating-ring, a master member and controlling and operating devices therefor, of a setting-lever, an operating-lever carried thereon and adjustably connected to the ring, and a latch on the master member coöperating with the operating-lever to open the blades, a pivoted returning-lever connected to the ring and a projection on the master member adapted to engage said lever to close the blades.

12. In a shutter, the combination with a casing having a plurality of blades therein, means for operating them and setting devices for regulating their opening movement, of an adjustable diaphragm arranged in proximity to the shutter-blades and means for operating the diaphragm and adjusting the setting devices whereby the aperture formed by the opening movement of the shutter-blades will correspond to the aperture in the diaphragm.

13. In a shutter, the combination with a casing having a plurality of blades therein, means for operating them and setting devices for regulating their opening movement, of an adjustable diaphragm arranged in proximity to the shutter-blades embodying an operating-plate, and an indicator arranged at the exterior of the casing, connections between the indicator and the setting device and the operating-plate whereby the diaphragm may be adjusted and the setting devices positioned.

14. In a shutter, the combination with a casing, a plurality of shutter-blades therein, means for operating them and a regulating device for controlling their opening movement, of an adjustable diaphragm arranged in the casing and embodying pivoted overlapping leaves and an adjusting-plate for moving them, a setting member coöperating with the regulating device and the adjusting-plate.

15. In a camera-shutter, the combination with a casing, overlapping shutter-blades pivoted therein, means for operating them and a device for regulating their opening movement, of an adjustable diaphragm arranged in the casing embodying pivoted leaves and a plate for adjusting them, a setting-plate journaled on the exterior of the casing having an indicator, a scale on the casing with which the indicator coöperates and connections between the setting-plate, the regulating device and the adjustable diaphragm-plate.

16. In an iris-diaphragm shutter the combination with a plurality of pivoted blades and means for operating them, of an iris-diaphragm arranged in proximity to the blades and composed of a plurality of overlapping pivoted leaves, a regulating device for controlling the opening movement of the shutter-blades, a member for adjusting the diaphragm-leaves and connections between the device and member for causing their simultaneous operation.

THEODOR BRUECK.

Witnesses:
JOHN REMEIN,
J. HAMMELE.